US008891411B2

(12) United States Patent
Averill et al.

(10) Patent No.: US 8,891,411 B2
(45) Date of Patent: Nov. 18, 2014

(54) SYSTEM AND METHOD FOR A CONFERENCE FOYER

(75) Inventors: Roderick Averill, Centennial, CO (US); Brian Hillis, Centennial, CO (US); Renato Simoes, Fortaleza (BR)

(73) Assignee: Avaya Inc., Basking Ridge, NJ (US)

( * ) Notice: Subject to any disclaimer, the term of this patent is extended or adjusted under 35 U.S.C. 154(b) by 266 days.

(21) Appl. No.: 13/243,719

(22) Filed: Sep. 23, 2011

(65) Prior Publication Data

US 2013/0077539 A1 Mar. 28, 2013

(51) Int. Cl.
*H04L 12/16* (2006.01)
*H04L 12/18* (2006.01)

(52) U.S. Cl.
CPC .................. *H04L 12/1818* (2013.01)
USPC .............. 370/261; 370/259; 370/471

(58) Field of Classification Search
USPC ................................. 370/259–269
See application file for complete search history.

(56) References Cited

U.S. PATENT DOCUMENTS

| 6,466,991 | B1 | 10/2002 | Moriyama et al. |
| 6,671,262 | B1 * | 12/2003 | Kung et al. ............ 370/260 |
| 6,978,001 | B1 * | 12/2005 | Shaffer et al. ............ 379/202.01 |
| 7,298,834 | B1 * | 11/2007 | Homeier et al. ............ 379/202.01 |
| 7,542,756 | B2 | 6/2009 | Mason et al. |
| 7,617,280 | B1 | 11/2009 | Webster et al. |
| 8,200,758 | B2 * | 6/2012 | Serr et al. ................ 709/205 |
| 2001/0009014 | A1 * | 7/2001 | Savage et al. ............ 709/204 |
| 2002/0133611 | A1 * | 9/2002 | Gorsuch et al. ............ 709/231 |
| 2010/0165889 | A1 * | 7/2010 | Madabhushi et al. ........ 370/261 |
| 2011/0069642 | A1 * | 3/2011 | Karam et al. ............ 370/260 |
| 2012/0275349 | A1 * | 11/2012 | Boyer et al. ............ 370/261 |

OTHER PUBLICATIONS

"Conferencing Components on the Front End Server", Microsoft/ TechNet, downloaded from http://technet.microsoft.com; printed Jun. 8, 2011.

* cited by examiner

*Primary Examiner* — Phuc Tran (57) ABSTRACT

Disclosed are systems, methods, and non-transitory computer-readable storage media for implementing a conference foyer for conferencing. The system receives a request to join a conference call that is hosted on a specific conference server. The system receives the request via a call from a caller using a specific phone number. The system is a back-to-back user agent configured to transfer requests to one or more SIP-based conference servers. Based on the request, the system identifies a specific conference server hosting the requested conference. The system uses a conference code included in the request to identify the specific conference server hosting the conference call. The system then transfers the call to the specific conference server, which can join the call to the conference requested by the caller. This approach provides a flexible, efficient, and scalable way to increase the number of conference calls associated with a specific phone number.

21 Claims, 10 Drawing Sheets

FIG. 3A (Continued)
FROM FIG 3A

SYSTEM AND METHOD FOR A CONFERENCE FOYER

BACKGROUND

1. Technical Field

The present disclosure relates to conferencing and more specifically to efficiently increasing the number of conference calls associated with a specific phone number.

2. Introduction

Businesses and individuals use conference calls daily to meet with remote parties. Conference calls allow individuals from geographically separated locations to communicate and interact as a group. Conference calls can be used to conduct meetings, presentations, classes, and otherwise to communicate with, or disseminate information to, a group of participants. In addition, conference calls are increasingly being used for entertainment or social purposes. Moreover, conference calls are generally viewed as an excellent means of cutting traveling costs, increasing productivity, and overcoming previously formidable barriers of distance and geography. Not surprisingly, conference calls have swiftly grown in use and popularity, resulting in large increases in demand.

A widely used approach of conference calling is the centralized server conferencing model. Here, a server acts as a user agent and is implemented on a certain device on a network. The server receives the media streams from all participants, mixes them and redistributes the appropriate media stream back to the participants. This approach has many important advantages. First, the centralized state of conference is easy to manage and control. This is extremely important given the complexity and variety of conferencing applications. Second, the centralized server conferencing model supports a broad variety of clients, as no special demands on bandwidth or processing are required from the clients. Another model used is the end system mixing model, which shifts the management to a specific device. This model is more suitable for small scale conferences of three or four participants. Other approaches use multicast or full mesh topologies for conferencing; these are limited by the range of clients supported in a conference.

Nevertheless, the increasing demand for conferencing has exposed several limitations in the current conferencing models. For example, to join a conference call, an individual typically must dial a telephone number associated with the conference call. Often, an individual must dial a different telephone number when he or she wants to add a different participant or join a different conference call. Both the individual and the group must have the proper telephone number to join, which can be a difficult and daunting task as the range of telephone numbers grows. A previous solution has been to host multiple conferences on a single device that can be accessed by a specific phone number. Here, a single phone number may be used to access multiple conferences: the user simply calls the device at the specific phone number and enters a conference code that identifies a specific conference. However, this solution is limited by the device's hosting capacity—once the device's hosting capacity is reached, a new device must be implemented, requiring a different phone number. As the demand for conferencing grows, more devices need to be installed, requiring even more phone numbers. What is needed is needed in the art is a flexible, efficient, and scalable way to increase the number of conference calls associated with a specific phone number.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein provide a flexible, efficient, and scalable way to increase the number of conference calls associated with a specific phone number. Specifically, a conference device associated with a specific phone number is configured to receive a caller's request to join a conference call hosted by a specific conference server. The conference device can then use the caller's request to identify the specific conference call, which can be hosted by any one of a group of conference servers, and specific conference server hosting the conference call. Once the conference device identifies the conference call and conference server, it transfers the call to the specific conference server, which adds the call to the conference hosted by the specific server.

By using a separate device with a particular phone number to identify the conference and transfer the call, an unlimited number of conference servers can be implemented to serve a particular number. As a result, an unlimited number of conference calls can be accessed from a single phone number. Thus, businesses and individuals only need to remember one phone number, which they can use to join an unlimited number of conference calls. In one specific example, a company can use a single technical support hotline number instead of multiple numbers.

Disclosed are systems, methods, and non-transitory computer-readable storage media for implementing a conference foyer for conferencing. The method is discussed in terms of a system configured to practice the method. The system first receives a request to join a conference call that is hosted on a specific conference server. The system receives the request via a call from a caller using a phone number. Moreover, the system is configured to transfer requests to one or more conference servers. The system is a back-to-back user agent and the conference servers are session initiation protocol (SIP) based servers.

The request includes a conference code entered by the caller, which identifies the conference call that the caller wants to join. Based on the conference code in the request, the system then identifies a specific conference server that is hosting the requested conference call. The system uses the conference code included in the request to identify the specific conference server hosting the conference call. Once the system identifies the specific conference server, it transfers the call to the specific conference server. The conference server can then join the call to the specific conference call requested by the caller, which is hosted by that conference server. This approach provides a flexible, efficient, and scalable way to increase the number of conference calls associated with a specific phone number, and can be applied to virtually any conferencing configuration and environment.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for a flexible, efficient, and scalable way to increase the number of conference calls associated with a specific phone number. A brief introductory description of a basic general purpose system or computing device in FIG. 1 which can be employed to practice all or part of the concepts is disclosed herein. A more detailed description of a conference foyer will then follow. These variations shall be discussed herein as the various embodiments are set forth. The disclosure now turns to FIG. 1.

Figure 1:
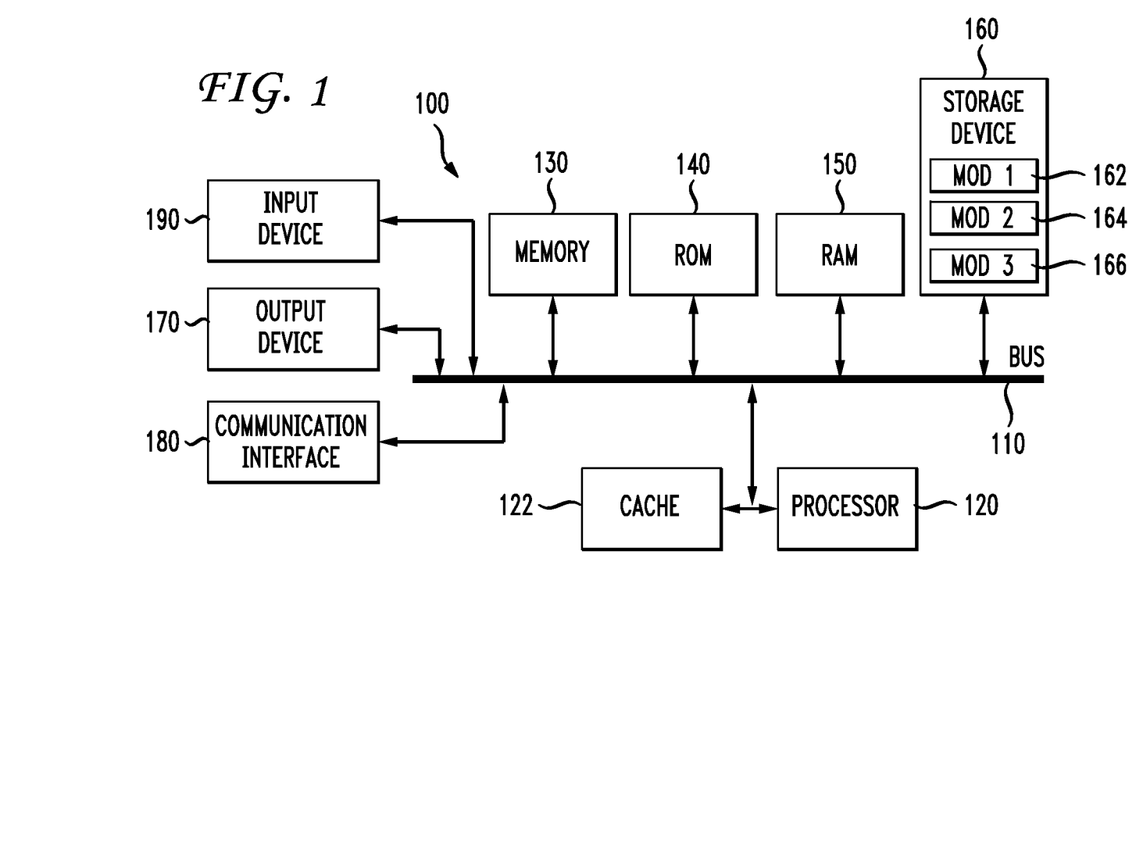
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2A:
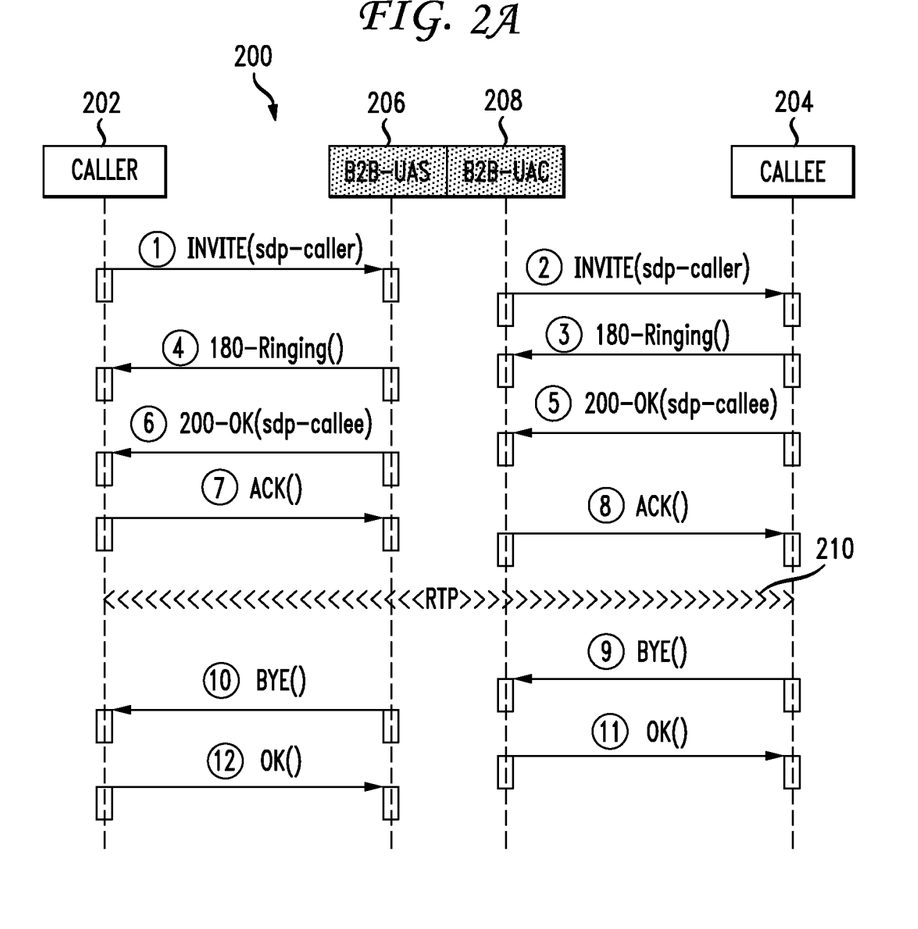
FIG. 2A illustrates an example basic SIP call flow based on a back-to-back user agent.

Having disclosed some components of a computing system, the disclosure now turns to FIG. 2A, which illustrates an example basic SIP call flow 200 based on a back-to-back user agent architecture. In this example, the back-to-back user agent server 206 and the back-to-back user agent client 208 reside in a single SIP server and are part of the same deployed SIP application.

The call flows as a mirror signaling, where the back-to-back user agent server 206 instructs the back-to-back user agent client 208 to forward its signaling on from the caller 202 to the callee 204 and vice versa. The back-to-back user agent terminates a signaling and starts a new one, insulating the endpoints. CallID, IP addresses, and via headers are all different from one SIP leg (i.e. the SIP leg from the caller 202 to the back-to-back user agent server 206) to the other SIP leg (i.e. from the callee 204 to the back-to-back user agent client 208).

At step 1, the caller 202 sends a SIP invite to the back-to-back user agent. At step 2, the back-to-back user agent sends an invite to the callee 204. At step 3, the callee 204 sends a ringing signal back to the back-to-back user agent, which relays that ringing signal to the caller 202 at step 4. At step 5, the callee 204 sends an OK or acceptance of the invite to the back-to-back user agent, which forwards that acceptance to the caller at step 6. At step 7, the caller 202 sends an acknowledgement of the acceptance to the back-to-back user agent, which forwards the acknowledgement to the callee 204 at step 8. At this point 210, the caller 202 and the callee 204 can establish communications with one another via real-time transport protocol (RTP) or other suitable protocol. Steps 9 and 10 and steps 11 and 12 demonstrate a set of goodbye and OK communications ending the invitation process. This type of call flow gives the application great flexibility in manipulating the endpoints.

Figure 2B:
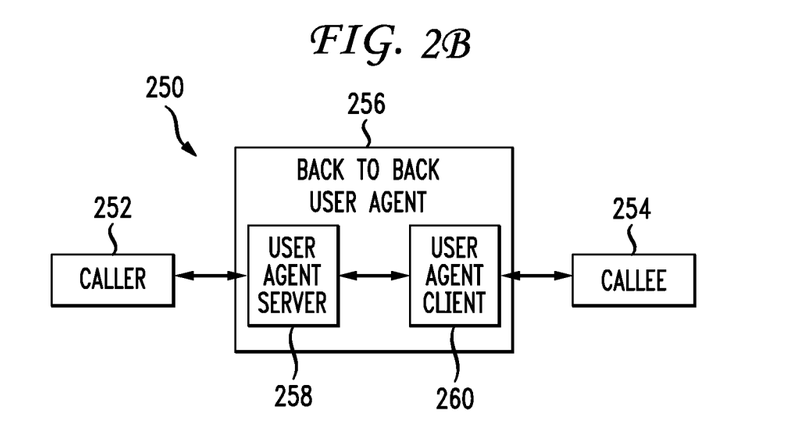
FIG. 2B illustrates an example network architecture supporting the basic SIP call flow of FIG. 2A.

FIG. 2B illustrates an example network architecture 250 supporting the basic SIP call flow of FIG. 2A. In this architecture, the caller 252 communicates with the callee 254 via a back-to-back user agent 256 which includes a user agent server 258 and a user agent client 260. In this architecture, the user agent server 258 and the user agent client 260 are separate software processes running in a same machine. The caller 252 and the callee 254 can be on the same physical network and/or virtual network as the back-to-back user agent.

Figure 3A:
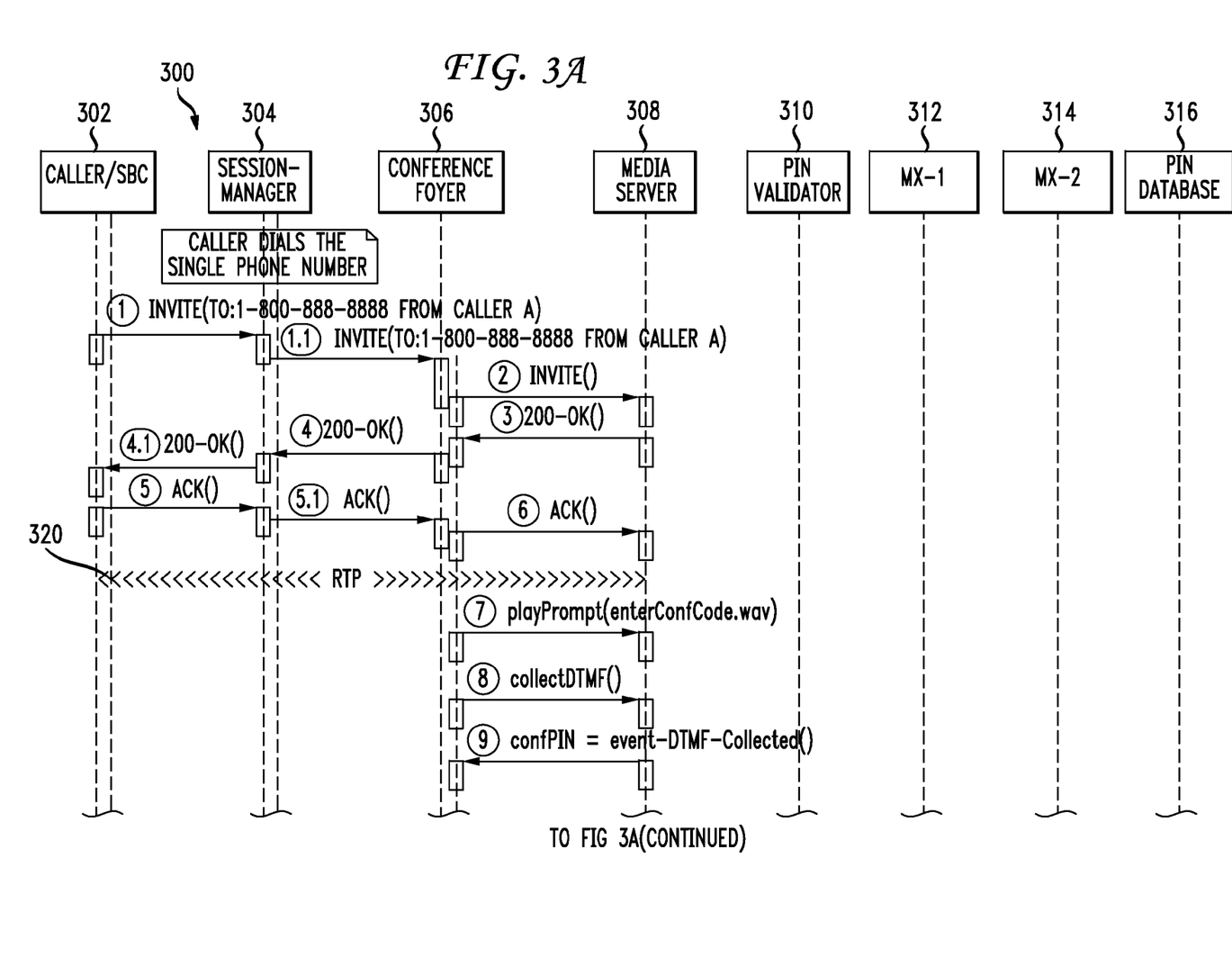
FIG. 3A illustrates an example SIP call flow based on a conference foyer.

FIG. 3A illustrates an example SIP call flow 300 based on a conference foyer. Here, the process is initiated when a caller 302 dials a specific phone number associated with a session manager 304. In this example, the session manager 304 is a device on the network that routes SIP sessions across the network. At step 1, the caller 302 sends a SIP INVITE to the session manager 304. The session manager 304 then redirects the call to the conference foyer 306. The conference foyer 306 is a back-to-back user agent SIP application that resides on a conference device (such as a SIP server) that sits before the conference servers 312, 314. In one embodiment, the session manager 304 and conference foyer 306 are different applications residing on the same conference device. In yet another embodiment, the session manager 304 and conference foyer 306 are part of the same application and reside on the same conference device.

At step 2, the conference foyer 306 connects the inbound INVITE to media server 308. In this example, the media server 308 is a SIP based media server on the network. The media server 308 can also be an application that resides on the same conference device as the session manager 304 and/or conference foyer 306. Steps 3 to 4.1 are respective OKs and steps 5 to 6 are respective acknowledgements. At this point, the caller 302 can establish communications with the media server 308 via RTP 320.

Once a communication is established between the caller 302 and the media server 308, the conference foyer 306 instructs the media server 308 to play a prompt for the caller 302 and collect input from the caller 302 at steps 7 and 8. The conference foyer 306 and media server 308 can use SIP and Media Server Markup Language (MSML) to establish and control media sessions, and/or any other network control protocol suited for media communications, such as Real Time Streaming Protocol (RTSP), H.248, VoiceXML and so forth. The prompt from the media server 308 can be used to request a conference code from the caller 302. For example, the conference foyer 306 can request the media server 308 to play a prompt to the caller 302 such as "please enter the conference code followed by the number sign." In response to the prompt from the media server 308, the caller 302 can use dual-tone multi-frequency signaling (DTMF) or voice commands to provide his or her input. In our example, the caller 302 uses DTMF to provide a conference code. At step 9, the media server 308 collects the input from the caller 302 and provides the input to the conference foyer 306. In our example, the media server 308 collects a conference code entered by the caller 302 and provides the conference code to the conference foyer 306.

At step 10, a PIN Validator 310 validates the conference code and returns the IP address of the conference server 314 hosting the specific conference call associated with the conference code. The PIN validator 310 is a program that validates a conference code provided by the caller 302 and maps the conference code to a specific conference server hosting the conference associated with the conference code. The PIN validator 310 can reside on the same SIP server as the conference foyer 306 or a separate device. The PIN validator 310 can also be part of the same application as the conference foyer 306 or its own application. To validate the conference code, the PIN Validator 310 can use a map, table, list, rule, policy, database, etc., that associates one or more conference codes with a specific conference server. The validation mechanism can be as simple as a map that specifies, for example, that all conference calls having a conference code that is 7 digits long and begins with a 1, 2, or 3 are hosted on IP address 1.1.1.1, and so on. Thus, in this example, if the conference code is 2345678, the PIN Validator 310 would return IP address 1.1.1.1, which belongs to the conference server that hosts the conference associated with the conference code 2345678.

At step 11, the conference foyer 306 stores a record of the transaction in the PIN Database DB 316. In one embodiment, the record includes the caller's phone number and the conference code entered by the caller 302 for correlating the phone number with the conference code. The PIN Database 316 can be a file, directory, log, table, database, cache, and so forth. In this example, the PIN Database 316 resides on the same conference device as the conference foyer 306. In another embodiment, the PIN Database 316 resides on a separated device as the conference foyer 306.

Once the conference foyer 306 knows the IP address of the conference server 314 hosting the conference, it transfers the call to the conference server 314. The conference foyer 306 does this, at step 12, by sending a transfer request (REFER) to the caller 302. The conference foyer 306 makes standard usage of the "Refer-To" header (a REFER header) to send the destination address of the conference server 314 and append the conference code collected by the media server 308. Steps 13 and 13.1 are respective OKs. At step 14, the caller 302, in response to the REFER, sends a new INVITE that includes a request URI. In one embodiment, the caller 302 sends a new INVITE that includes a request URI with the following format: "sip:Bridge1000-confPIN2345678@1.1.1.1," where Bridge1000 is the bridge number, confPIN2345678 is the conference code, and 1.1.1.1 is the IP address of the conference server. The conference server 314 receives the new INVITE at step 14.1. Steps 15 and 15.1 are respective OKs and steps 16 and 16.1 are respective acknowledgements.

Steps 17, 17.1, and 18 are respective BYEs and steps 19, 20, and 20.1 are respective OKs. Here, the conference foyer 306 is no longer needed after the transfer. Accordingly, the conference foyer 306 leaves the call flow as the caller 302 is being transferred into the conference. By getting out of the call flow this early, the conference foyer 306 increases its capacity to handle calls and minimizes high-availability or failover risks. At this point, the caller 302 can establish communications with the conference server 314 via RTP 320.

Figure 3B:
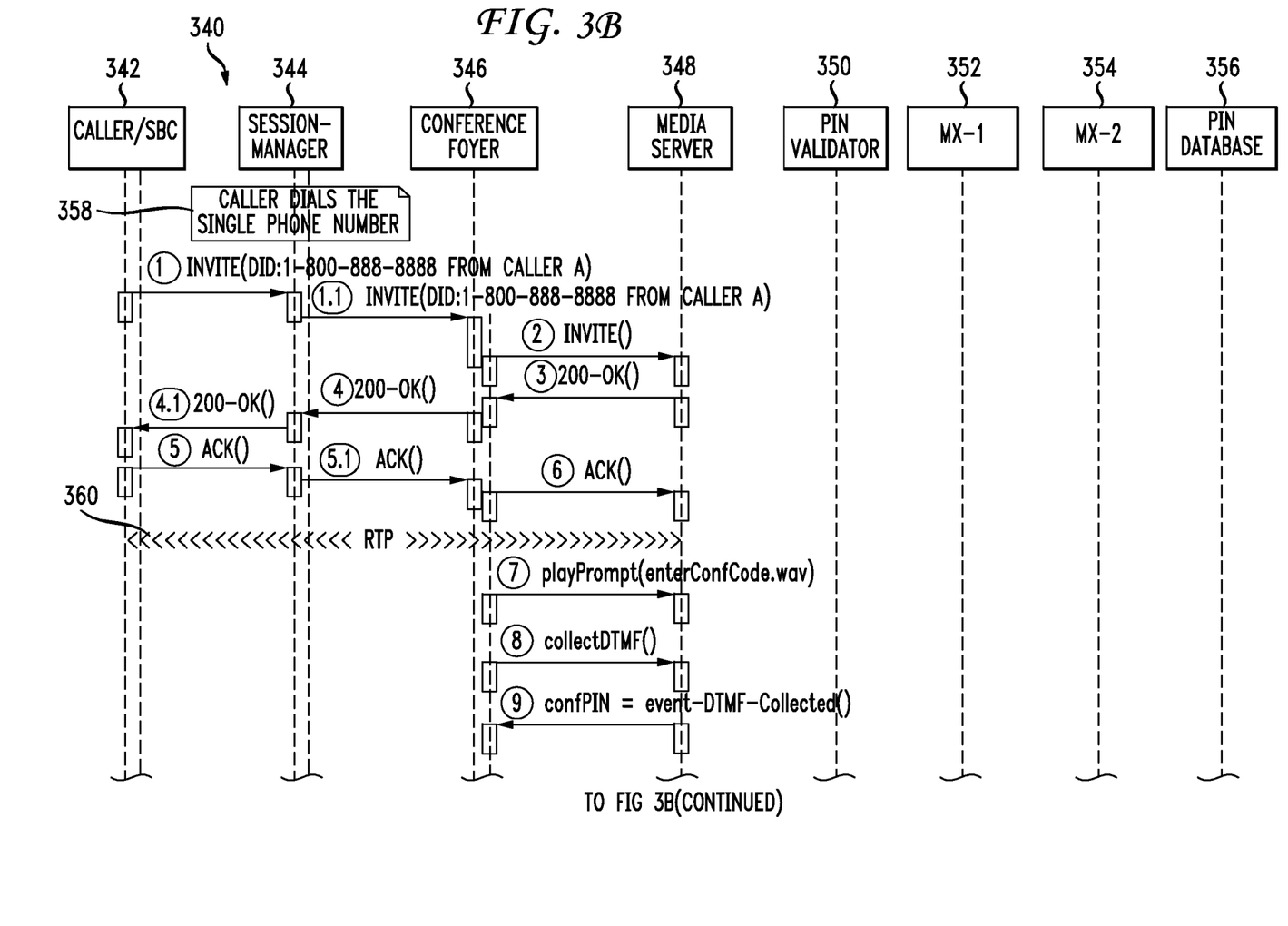
FIG. 3B illustrates an example automated conference rejoin use case of the SIP call flow based on a conference foyer.

FIG. 3B illustrates an example automated conference rejoin use case of the SIP call flow 340 based on a conference foyer 346. In this example, a caller 342 can automatically rejoin a conference call by entering a predefined code following a prompt by the media server 348. This can be useful, for example, if the caller 342 wants to rejoin a conference call but does not remember the conference code or otherwise have immediate access to it.

In this example, the process is similarly initiated when a caller 342 dials a specific phone number associated with the session manager 344. At step 1, the caller 342 sends a SIP INVITE to the session manager 344, which redirects the call to the conference foyer 346. At step 2, the conference foyer 346 connects the inbound INVITE to media server 348. Steps 3 to 4.1 are respective Oks and steps 5 to 6 are respective acknowledgements. At this point, the caller 342 can establish communications with the media server 348 via RTP 360.

At steps 7 and 8, the conference foyer 346 instructs the media server 348 to play a prompt for the caller 342 and collect input from the caller 342. Here, the caller 342 can enter a predefined code. The predefined code can be any number, character, symbol, or combination thereof. In one embodiment, the predefined code is the asterisk symbol ("*"), which simplifies the process for the caller 342, as the asterisk symbol is commonly used by IVRs as a "go back" key. At step 9, the media server 348 collects the input from the caller 342 and provides the input to the conference foyer 346. In our example, the caller 342 would enter the asterisk symbol, which the media server 348 then collects and returns to the conference foyer 346.

At step 10, the conference foyer 346 checks if the input entered by the caller 342 is equal to the predefined code (e.g., "*"). If so, the conference foyer 346 treats the call as a request to rejoin the last conference joined by the caller 342. Accordingly, the conference foyer 346 retrieves the last conference code used by the caller 342 from the PIN Database 356. The PIN Validator 350 then validates the conference code retrieved by the conference foyer 346 and returns the IP address of the conference server 354 hosting the last conference call joined by the caller 342. In another embodiment, the caller 342 can enter a predefined code (e.g., "#") as the conference code to automatically join a conference call as a host. Here, the conference foyer 346 is preconfigured to have a mapping of users' conference host code and their trusted phone numbers. Accordingly, the conference foyer 346 will know that the user wants to join as a host, so the user will be able to automatically join the conference call as a host.

Once the conference foyer 346 knows the IP address of the conference server 354 hosting the last conference call joined by the caller 342, it transfers the call to the conference server 354. The conference foyer 346 does this, at step 11, by sending a transfer request (REFER) to the caller 342. Steps 12 and 12.1 are respective OKs. At step 13, the caller 342, in response to the REFER, sends a new INVITE that includes a request URI, which the conference server 354 receives at step 13.1. Steps 14 and 14.1 are respective OKs and steps 15 and 15.1 are respective acknowledgements.

After the transfer, the conference foyer 346 is no longer needed and consequently leaves the call flow as the caller 342 is being transferred into the conference. To this end, steps 16, 16.1, and 17 are respective BYEs and steps 18, 19, and 19.1 are respective OKs. At this point, the caller 342 can rejoin the last conference, which is hosted by conference server 354, via RTP 362.

Figure 3C:
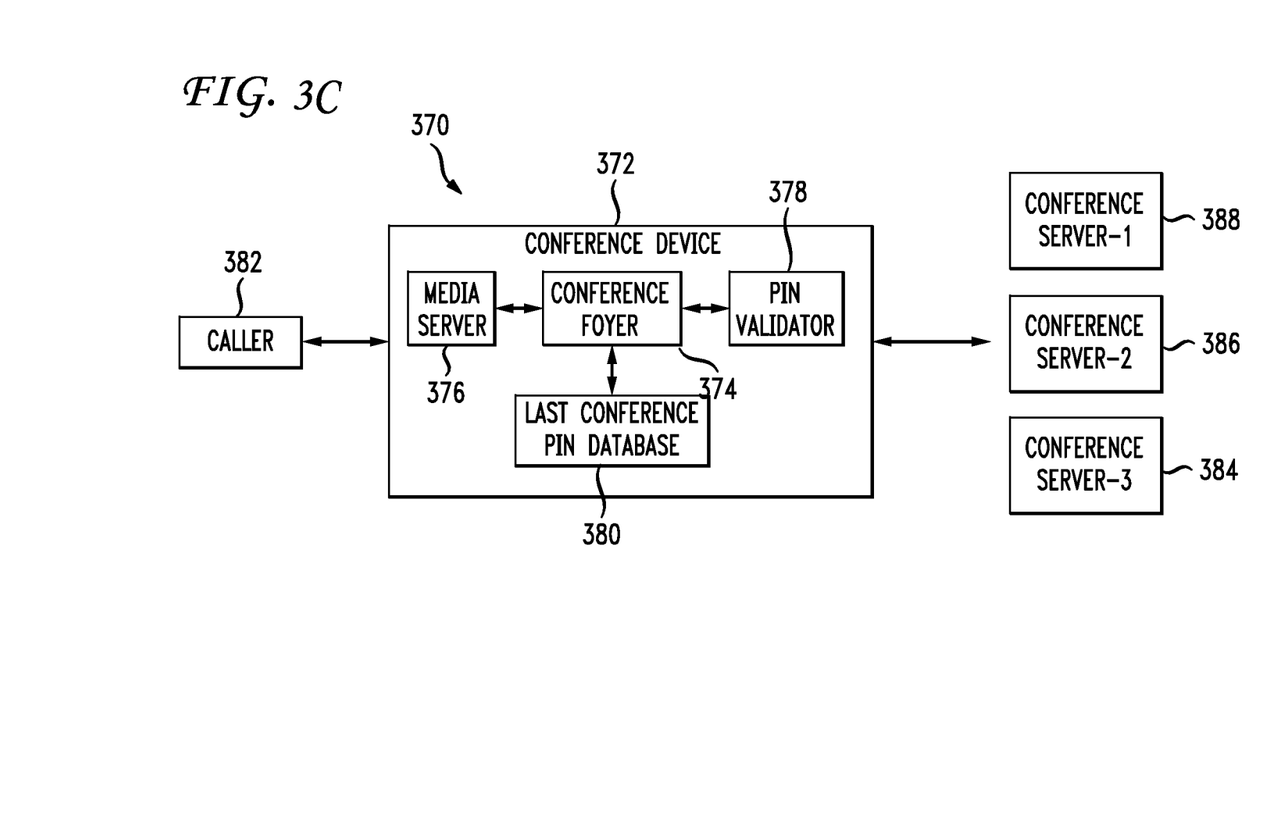
FIG. 3C illustrates an example network architecture supporting the basic SIP call flow of FIGS. 3A and 3B.

FIG. 3C illustrates an example network architecture 370 supporting the basic SIP call flow of FIGS. 3A and 3B. In this architecture, the caller 382 communicates with the conference server 384 via a conference device 372. The conference device 372 is a back-to-back user agent. The conference device 372 includes a conference foyer 374 and PIN Validator 378 application, and a PIN Database 380. The conference foyer 374 connects the caller 382 to a media server 376, which is a SIP based media server. The media server 376 plays a prompt to the caller 382, requesting a conference code. The caller 382 receives the prompt and responds by entering a DTMF input. The media server 376 then collects the input entered by the caller 382 and returns it to the conference foyer 374. The media server 376 can be on the same physical network and/or virtual network as the conference device 372.

The conference foyer 374 then communicates with the PIN Validator 378, which validates the DTMF input entered by the caller 382 and returns the IP address of the conference server 384. The conference foyer 374 also stores the DTMF input on the PIN Database 380 which can be, for example, a relational database. The DTMF input can be stored as a table, record, field in the PIN Database 380. In one embodiment, the conference stores the caller's phone number and the conference code entered by the caller 382 in a way that preserves their relationship. For example, the caller's phone number can be a table and the DTMF input can be a field in the table. In another example, the caller's phone number can be stored in a record that includes the DTMF input.

Once the conference foyer 374 has the IP address of the conference server 384, the conference device 372 can transfer the caller 372 to the conference server 384. As the caller 372 is being transferred to the conference server 384, the conference device 372 can release itself from the call flow as it is no longer needed by the caller 382 or the conference server 384. At this point, the caller 382 can establish communications with the conference server 384, which can add the caller 382 to the particular conference call.

Figure 4:
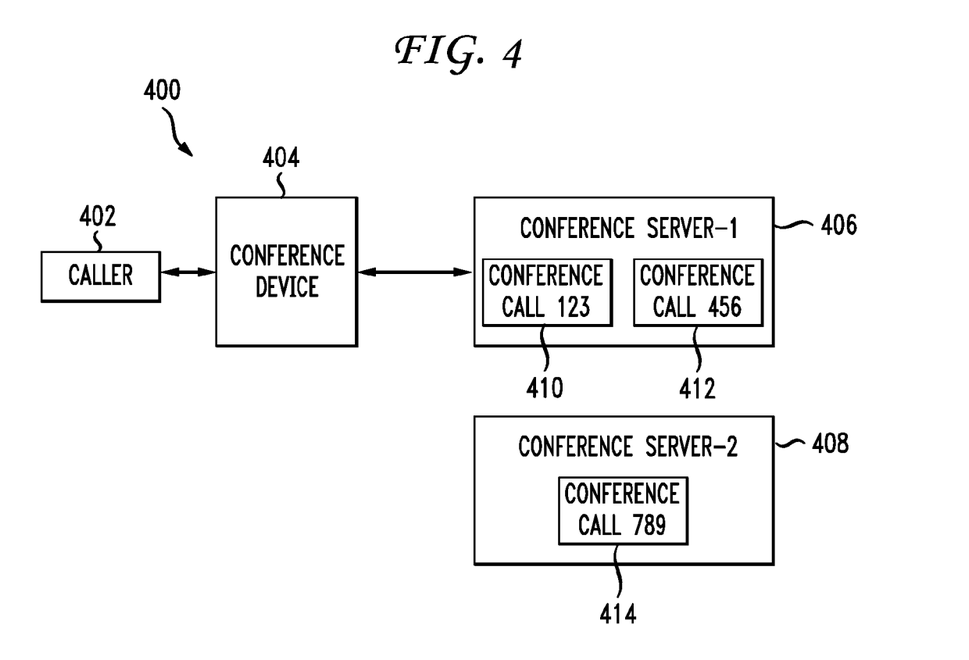
FIG. 4 illustrates an example of a conference server on a network adding a call to a conference hosted on the conference server based on a request from a conference foyer.

The disclosure turns now to an example conference server 406, as shown in FIG. 4, that adds a call to a conference 412 hosted on the conference server 406 based on a request from a conference device 404. The conference server 406 can be a device on the same physical and/or virtual network as the conference device 404. In one variation, the conference server 406 and the conference device 404 are not on the same local network, but rather communicate over the Internet. Moreover, the conference server 406 can host one or more conference calls, and is configured to receive requests from the conference device 404 to join calls made to the phone number assigned to the conference device 404 to conferences calls hosted by the conference server 406. In this example, the conference server 406 is a SIP-based server hosting multiple conference calls 408, 410, 412, 414. In another embodiment, the conference server 406 is an H.323-based server hosting a conference call.

Here, a caller 402 initiates the process by dialing a specific phone number associated with the conference device 404. In one embodiment, the caller 402 dials a direct inward dialing (DID) number assigned to the conference device 404. In another embodiment, the caller 402 dials a direct inward dialing (DID) number assigned to a communications gateway that routes the call to the conference device 404. Once the phone call between the caller 402 and the conference device 404 is established, the conference device 404 sends a prompt to the caller 402 to enter a conference code. The conference device 404 can send a request to a separate media server to send the prompt to the caller 402.

Next, the caller 402 receives the prompt and enters a conference code assigned to the conference call 408, 410, 412, 414 the caller 402 wants to join. In this example, the caller enters conference code 2345678, which is assigned to conference call 412. The conference device 404 then receives the conference code 2345678 entered by the caller 402, which can be voice and/or DTMF input, and validates the conference code 2345678 to determine the IP address of the conference server 406 hosting the conference call 412 assigned to conference code 2345678. If the conference code entered by the caller 402 matches a predefined conference rejoin code, the conference device 404 treats the call from the caller 402 as a rejoin request. Accordingly, the conference device 404 retrieves the last conference code used by the caller 402 from storage and validates the conference code to determine the IP address of the conference server 406 hosting the conference call that the caller 402 wishes to rejoin.

Once the conference device 404 knows the IP address of the conference server 406 hosting the conference call 412 assigned to conference code 2345678, it transfers the call to the conference server 406. To transfer the call, the conference device 404 sends a REFER to the caller 402 specifying the conference code 2345678 as part of the SIP user to receive the transferred call. The caller 402 will then issue a new INVITE which includes a request URI. Next, the conference server 406 OKs the INVITE. At this point, the caller 402 can establish communications with the conference server 406 via RTP 320.

Next, the conference server 406 adds the caller 402 to the conference call 412. Here, the conference server 406 parses the conference code 2345678 from the request URI included in the INVITE, and automatically adds the caller 402 to the conference call 412.

Figure 5:
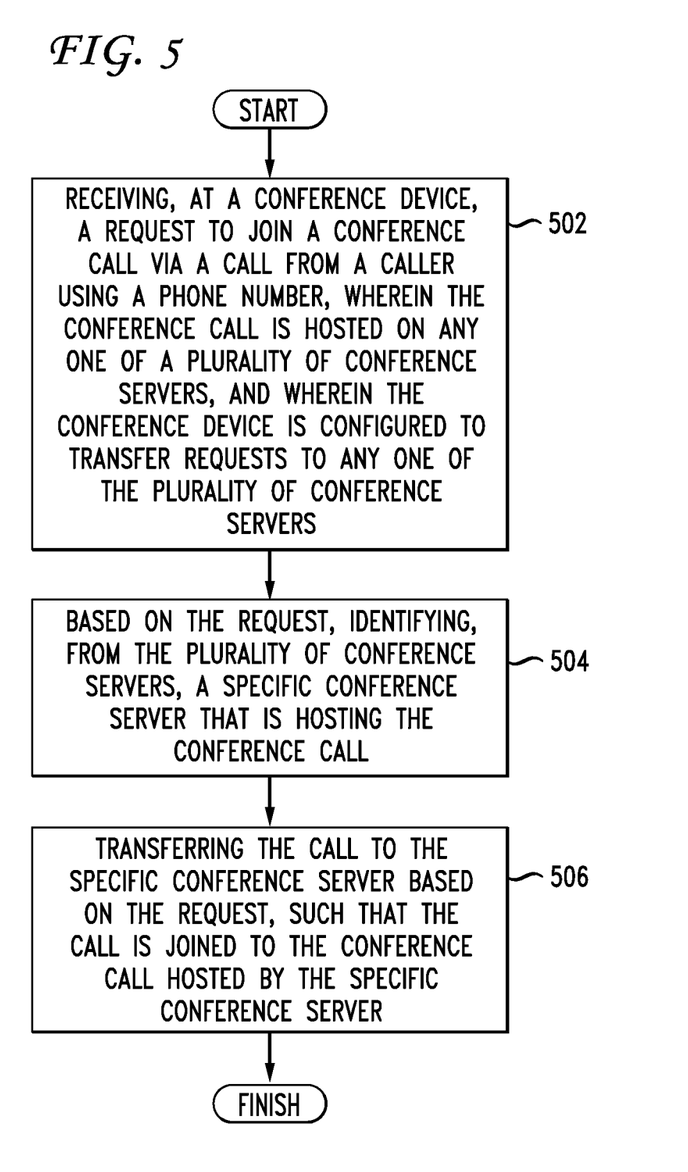
FIG. 5 illustrates an example method embodiment of the operations of a conference foyer.
Figure 6:
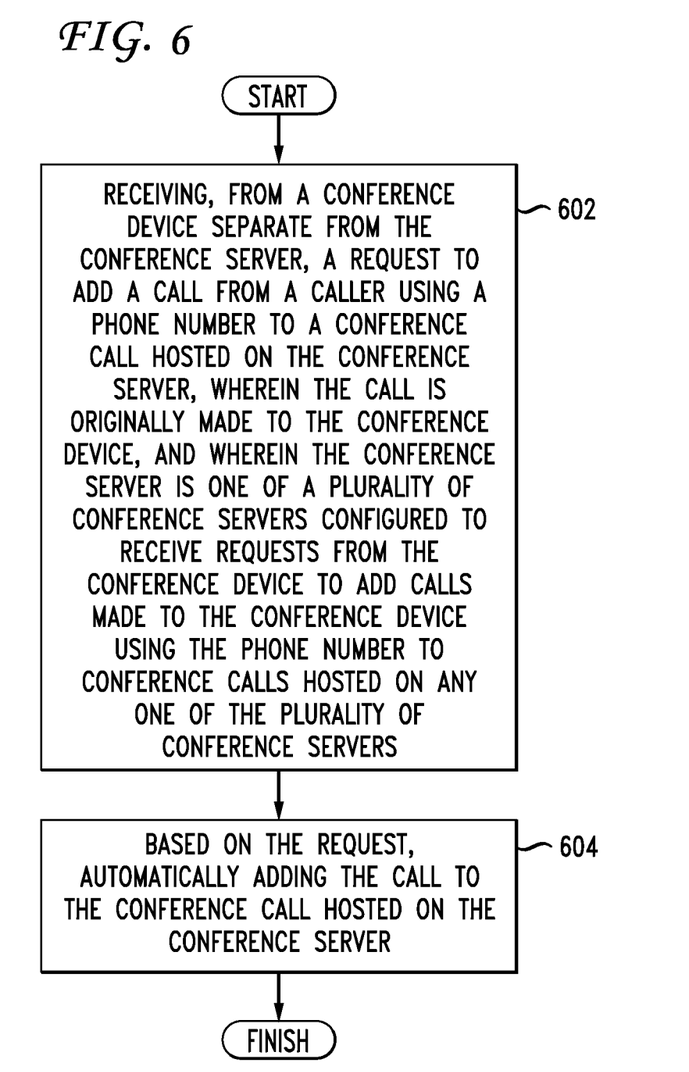
FIG. 6 illustrates an example method embodiment of the operations of a conference server.

Having disclosed some basic system components and concepts, the disclosure now turns to the exemplary method embodiments shown in FIGS. 5 and 6. For the sake of clarity, the methods are discussed in terms of an exemplary system 100 as shown in FIG. 1 configured to practice the respective methods. The steps outlined herein are exemplary and can be implemented in any combination thereof, including combinations that exclude, add, or modify certain steps.

FIG. 5 illustrates an example method embodiment of the operations of a conference foyer. The system 100, which is configured to transfer requests to one or more conference servers, receives a request to join a conference call via a call from a caller using a phone number, where the conference call is hosted on one of the conference servers (502). Here, the system 100 can be a back-to-back user agent and the conference servers can be SIP-based servers.

The request includes a conference code entered by the caller which identifies the conference call that the caller wants to join. Based on the conference code in the request, the system 100 identifies a specific conference server that is hosting the requested conference call (504). The system 100 uses the conference code entered by the caller to identify the specific conference server hosting the conference call. Once the system 100 identifies the specific conference server, it transfers the call to the specific conference server, such that the call is joined to the conference call hosted by the specific conference server (506). The system can automatically rejoin the caller to the last conference joined by the caller, such as if the last conference is still ongoing, or if the caller dropped off the call prematurely.

FIG. 6 illustrates an example method embodiment of the operations of a conference server. The system 100 receives a request from a conference device to add a call, which was originally made to the conference device from a caller using a phone number, to a conference call hosted on the system 100 (602). Here, the system 100 is one of multiple conference servers configured to receive requests from the conference device to add calls made to the conference device at the phone number to conference calls hosted on one of the multiple conference servers. Moreover, the system 100 is a SIP-based server on a network. The request includes a conference code entered by the caller which identifies a conference call that the caller wants to join.

Based on the request, the system 100 automatically adds the call to the conference call hosted on the system 100 (604). Here, the system 100 uses the conference code in the request to identify the specific conference call requested and join the call to that specific conference call.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD- ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can be applied to virtually any conferencing configuration and environment. Those skilled in the art will readily recognize various modifications and changes that may be made to the principles described herein without following the example embodiments and applications illustrated and described herein, and without departing from the spirit and scope of the disclosure.

We claim:

1. A method comprising:
   receiving, at a conference device via a call from a caller using a first phone number associated with the conference device, a request to rejoin a conference call that the caller has most recently joined, wherein the conference call is hosted on any one of a plurality of conference servers, and wherein the conference device is configured to transfer requests to any one of the plurality of conference servers;
   identifying a second phone number associated with the caller;
   retrieving, from a database, a conference code associated with the conference call by using the second phone number, wherein an association between the conference code and the second phone number is stored in the database, and wherein the conference code is not provided by the user to the conference device during the call via the request;
   based on the request and the conference code, identifying, from the plurality of conference servers, a specific conference server that is hosting the conference call; and
   transferring the call to the specific conference server based on the request, such that the call is joined to the conference call.

2. The method of claim 1, the method further comprising adding the caller to the conference call.

3. The method of claim 2, wherein the conference device is released from a call flow associated with the call, as the caller is being added to the conference call.

4. The method of claim 1, wherein the conference device comprises a session initiation protocol server.

5. The method of claim 1, the method further comprising requesting an input from the caller.

6. The method of claim 1, wherein the request comprises a predefined code.

7. The method of claim 1, wherein the call is transferred using a SIP REFER method.

8. The method of claim 1, wherein the specific conference server parses the conference code from a session initiation protocol uniform resource identifier.

9. The method of claim 1, wherein a plurality of conference devices are configured to transfer the requests to the any one of the plurality of conference servers.

10. The method of claim 1, further comprising:
   prior to receiving the request, preserving, from a prior conference call associated with the conference code, a relationship between the second phone number and the conference code by storing the relationship in the database.

11. The method of claim 1, further comprising:
   prior to preserving the relationship, joining the user to the prior conference call upon receiving the conference code from the user, wherein the user has called into the prior conference call from
   the second phone number.

12. A system comprising:
   a processor;
   a computer-readable storage medium storing instructions which, when executed by the processor, cause the processor to perform operations comprising:
      receiving, via a call from a caller using a first phone number, a request to rejoin a conference call that the caller has most recently joined, wherein the conference call is hosted on any one of a plurality of conference servers, and wherein the system is configured to transfer requests to any one of the plurality of conference servers;
      identifying a second phone number associated with the caller;
      retrieving, from a database, a conference code associated with the conference call by using the second phone number, wherein an association between the conference code and the second phone number is stored in the database, and wherein the conference code is not provided by the user to the conference device during the call via the request;
      based on the request and the conference code, identifying, from the plurality of conference servers, a specific conference server that is hosting the conference call; and transferring the call to the specific conference server based on the request, such that the call is joined to the conference call.

13. The system of claim 12, wherein the system comprises a back-to-back user agent.

14. The system of claim 12, wherein the system comprises a session initiation protocol server.

15. The system of claim 12, wherein the system is released from a call flow associated with the call, as the caller is being transferred to the conference call.

16. The system of claim 12, wherein the call is transferred using a SIP REFER method.

17. The system of claim 12, wherein the computer-readable storage medium stores additional instructions which, when executed by the processor, cause the processor to perform further operations comprising:
prior to receiving the request:
joining the user to a prior conference call associated with the conference code upon receiving the conference code from the user, wherein the user has called into the prior conference call from the second number; and
preserving a relationship between the second phone number and the conference code by storing the relationship in the database.

18. A computer-readable storage device storing instructions which, when executed by a processor, cause the processor to perform operations comprising:
receiving, via a call from a caller, a request to rejoin a conference call that the caller has most recently joined, wherein the conference call is hosted on any one of a plurality of conference servers, and wherein the processor is configured to transfer requests to any one of the plurality of conference servers;
identifying a second phone number associated with the caller;
retrieving, from a database, a conference code associated with the conference call by using the second phone number, wherein an association between the conference code and the second phone number is stored in the database, and wherein the conference code is not provided by the user to the conference device during the call via the request;
based on the request and the conference code, identifying, from the plurality of conference servers, a specific conference server that is hosting the conference call; and
transferring the call to the specific conference server based on the request, such that the call is joined to the conference call.

19. The computer-readable storage device of claim 18, wherein the input comprises a predefined code.

20. The computer-readable storage device of claim 19, wherein identifying the specific conference server comprises identifying an Internet protocol address of the specific conference server.

21. The computer-readable storage device of claim 18, wherein the computer-readable storage device stores additional instructions which, when executed by the processor, cause the processor to perform further operations comprising:
prior to receiving the request:
joining the user to a prior conference call associated with the conference code upon receiving the conference code from the user, wherein the user has called into the prior conference call from the second number; and
preserving a relationship between the second phone number and the conference code by storing the relationship in the database.

* * * * *